US012809228B2

(12) United States Patent
Kunai et al.

(10) Patent No.: US 12,809,228 B2
(45) Date of Patent: Nov. 24, 2026

(54) SPATIAL LIGHT MODULATOR AND OPTICAL COMPUTING DEVICE

(71) Applicant: FUJIKURA LTD., Tokyo (JP)

(72) Inventors: Yuichiro Kunai, Tokyo (JP); Masahiro Kashiwagi, Tokyo (JP)

(73) Assignee: Fujikura Ltd., Tokyo (JP)

( * ) Notice: Subject to any disclaimer, the term of this patent is extended or adjusted under 35 U.S.C. 154(b) by 204 days.

(21) Appl. No.: 18/838,893

(22) PCT Filed: Nov. 10, 2022

(86) PCT No.: PCT/JP2022/041895

§ 371 (c)(1),
(2) Date: Aug. 15, 2024

(87) PCT Pub. No.: WO2023/157400

PCT Pub. Date: Aug. 24, 2023

(65) Prior Publication Data

US 2025/0138388 A1 May 1, 2025

(30) Foreign Application Priority Data

Feb. 18, 2022 (JP) ................................ 2022-024218

(51) Int. Cl.
*G02F 3/00* (2006.01)

(52) U.S. Cl.
CPC .................................... *G02F 3/00* (2013.01)

(58) Field of Classification Search
CPC .......... G02F 3/00; G02F 1/09; G02F 2203/12; G02F 2203/50; G02F 1/133512; H10B 63/10
See application file for complete search history.

(56) References Cited

U.S. PATENT DOCUMENTS 5,267,183 A * 11/1993 Guilfoyle .................. G06E 1/02 708/191
2016/0349702 A1* 12/2016 Sung .................... G03H 1/2294
2022/0085119 A1* 3/2022 Huang .................. H10K 59/38

FOREIGN PATENT DOCUMENTS

| | | | | |
|---|---|---|---|---|
| JP | 2006-038944 | A | | 2/2006 |
| JP | 2007-510174 | A | | 4/2007 |
| JP | 2009109756 | A | * | 5/2009 |
| JP | 2010282103 | A | * | 12/2010 |
| JP | 2012-078579 | A | | 4/2012 |
| JP | 2013-045091 | A | | 3/2013 |
| JP | 2013218142 | A | * | 10/2013 |
| JP | 2017-198949 | A | | 11/2017 |
| WO | 2008-100043 | A1 | | 8/2008 |

OTHER PUBLICATIONS

International Search Report issued in corresponding International Application No. PCT/JP2022/041895, mailed Jan. 10, 2023 (2 pages).
Written Opinion issued in corresponding International Application No. PCT/JP2022/041895, mailed Jan. 10, 2023, with translation (10 pages).

* cited by examiner

*Primary Examiner* — Mariam Qureshi
(74) *Attorney, Agent, or Firm* — Osha Bergman Watanabe & Burton LLP

(57) ABSTRACT

A spatial light modulator includes unit cells each comprising two or more adjacent microcells, wherein the microcells each have a cell size that is either less than 1 μm or equal to or smaller than a wavelength of signal light and a black matrix that surrounds the unit cells.

8 Claims, 4 Drawing Sheets

SPATIAL LIGHT MODULATOR AND OPTICAL COMPUTING DEVICE

BACKGROUND

Technical Field

The present invention relates to a spatial light modulator and an optical computing device including a plurality of spatial light modulators.

Discussion of the Background

A spatial light modulator is obtained by arranging a plurality of optical modulators in a matrix. As the spatial light modulator, a liquid crystal on silicon (LCOS, see, for example, Patent Literature 1) and a digital mirror device (DMD, see, for example, Patent Literature 2) are known. These spatial light modulators are used in, for example, projectors.

PATENT LITERATURE

Patent Literature 1: JP Patent Publication No. 2017-198949

Patent Literature 2: JP Patent Publication No. 2007-510174

With these spatial light modulators, it is difficult to reduce a pixel size. In addition, with a liquid crystal on silicon (LCOS) and a digital mirror device (DMD), it is difficult to operate an LCOS and a DMD at high speed. This is because a liquid crystal is used in an LCOS and a mirror is mechanically moved in a DMD.

SUMMARY

The inventors of the present application found that in a spatial light modulator including a plurality of microcells arranged in a matrix, injection of a spin current into a magnetization free layer included in each microcell enables a phase-modulation amount of the magnetization free layer to be controlled. Here, each microcell corresponds to each pixel of a spatial light modulator. In order to inject a spin current into a magnetization free layer, a spin transfer torque magnetic reversal (STT)-magnetoresistive random access memory (MRAM) technique or a spin orbit torque (SOT)-MRAM technique can be used. That is, the inventors of the present application found that use of the STT- or SOT-MRAM technique makes it possible to provide a spatial light modulator capable of being reduced in size and operating at high speed. Note that in the present specification, a spatial light modulator that controls a phase-modulation amount of a magnetization free layer by injecting a spin current into the magnetization free layer is referred to as a "spin injection-type spatial light modulator".

As in the case of the LCOS, also in a spin injection-type spatial light modulator, wires for driving the plurality of microcells arranged in a matrix are provided around the microcells. The regions in which these wires are provided are regions in which signal light inputted into the spatial light modulator cannot be modulated by transmitting or reflecting the signal light. In many products, such regions thereof are subjected to anti-reflection processes in order to reduce unintentional reflection on these regions. These regions are called a "black matrix".

Note that in a typical LCOS, a pixel size is, for example, 6 μm, and an aperture ratio of each of the pixels is, for example, 96%. An aperture ratio is a ratio of an area of the magnetization free layer relative to an area of the entire pixel (the sum of an area of the magnetization free layer and a region of a black matrix) when the pixel is seen in plan view.

In a case where the cell size of the pixel or the microcell is clearly larger than a wavelength of signal light (for example, a case where signal light having a wavelength of 1 μm is inputted into the typical LCOS described above), the signal light can enter the magnetization free layer without being affected by the black matrix.

On the other hand, in a case where the cell size is approximately equal to a wavelength of signal light or is smaller than the wavelength of the signal light (for example, in a case where signal light having a wavelength of 1 μm is inputted into a spin injection-type spatial light modulator having a cell size of 1 μm), it becomes more likely that the signal light is affected by the black matrix when entering the magnetization free layer. This likely results in a larger loss.

One or more embodiments provide a spatial light modulator capable of reducing a cell size and reducing a loss occurring due to the reduced size.

A spatial light modulator in accordance with one or more embodiments is a spatial light modulator including: a plurality of microcells which are two-dimensionally arranged and each of which has a cell size of less than 1 μm or has a cell size equal to or smaller than a wavelength of signal light; and a black matrix. In the present spatial light modulator, a configuration is employed in which the plurality of microcells include a plurality of unit cells each of which includes a predetermined number of microcells adjacent to each other (two or more adjacent microcells), and the black matrix is provided so as to surround the plurality of unit cells.

According to one or more embodiments, it is possible to provide a spatial light modulator capable of reducing a cell size and reducing a loss occurring due to the reduced size.

DESCRIPTION OF THE EMBODIMENTS

Example 1

Figure 1:
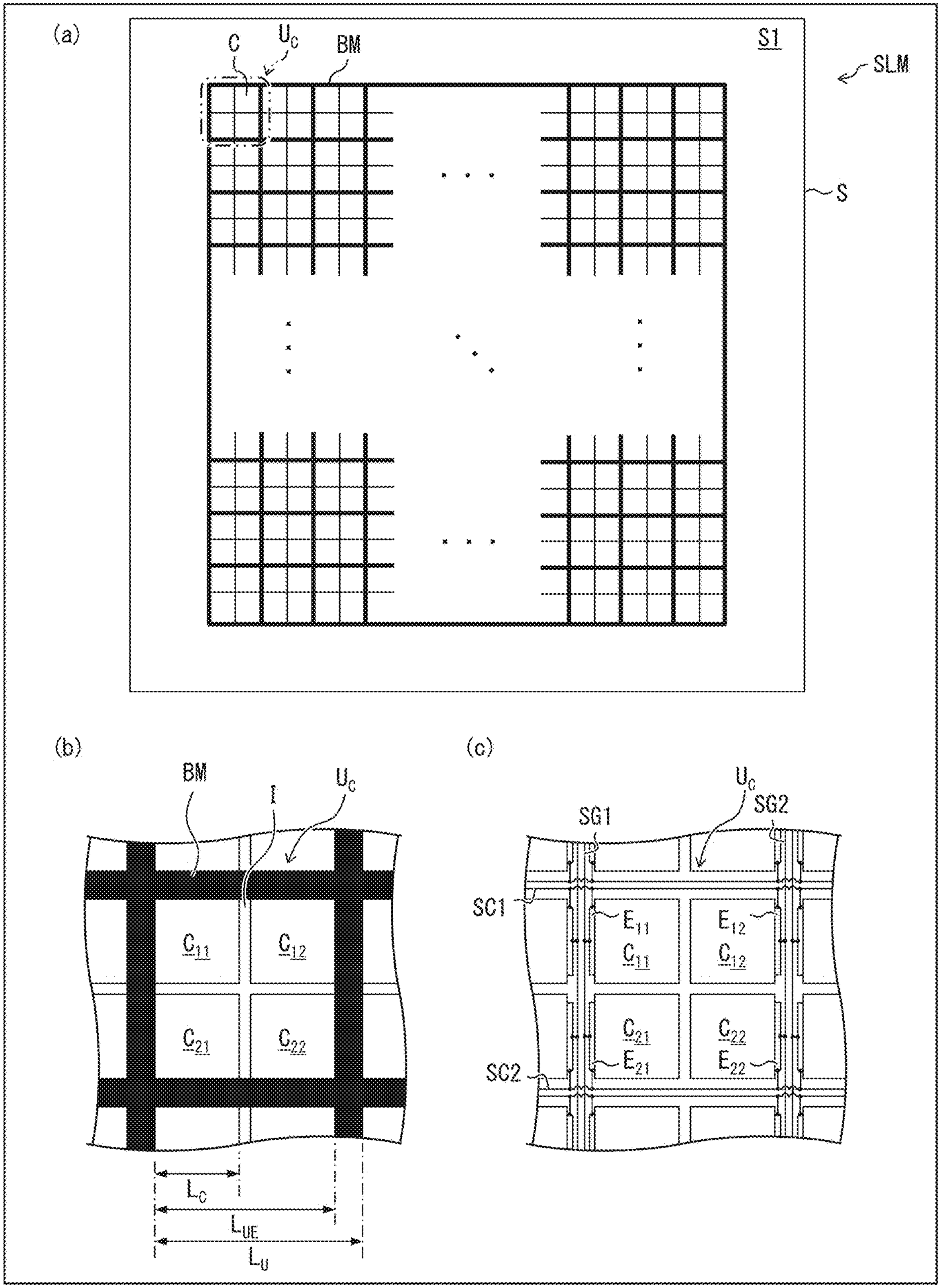
FIG. 1 shows a plan view illustrating a spatial light modulator in accordance with Example 1 of one or more embodiments and plan views illustrating a unit cell included in the spatial light modulator.

With reference to FIG. 1, the following description will discuss a spatial light modulator SLM in accordance with Example 1 of one or more embodiments. (a) of FIG. 1 is a plan view illustrating the spatial light modulator SLM. (b) and (c) of FIG. 1 are each a plan view illustrating a unit cell $U_C$ included in the spatial light modulator SLM. Note that (b) of FIG. 1 illustrates a spatial light modulator SLM in which a black matrix BM and an insulator I are formed, and (c) of FIG. 1 illustrates a spatial light modulator SLM in which the black matrix BM and the insulator I are omitted.

Figure 2:
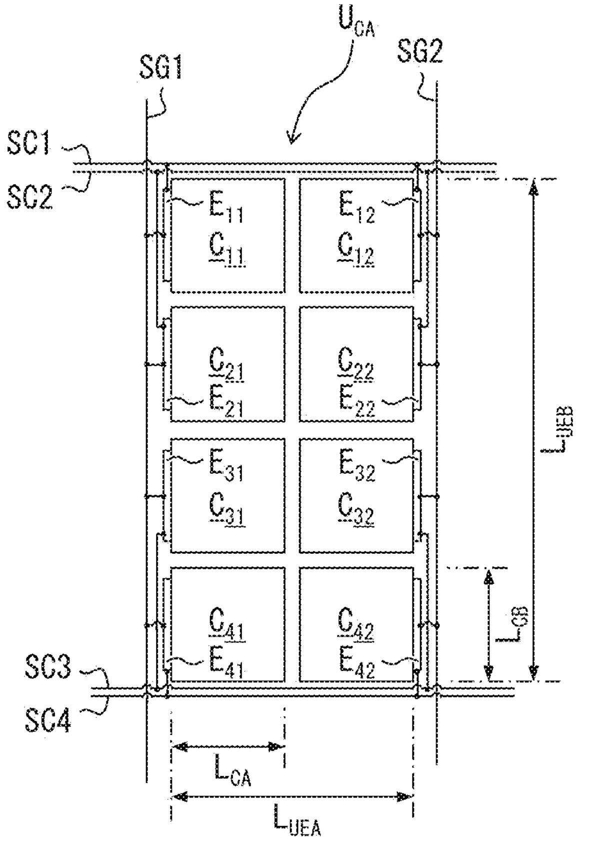
FIG. 2 is a plan view illustrating a variation of the unit cell illustrated in (b) and (c) of FIG. 1.
Figure 3:
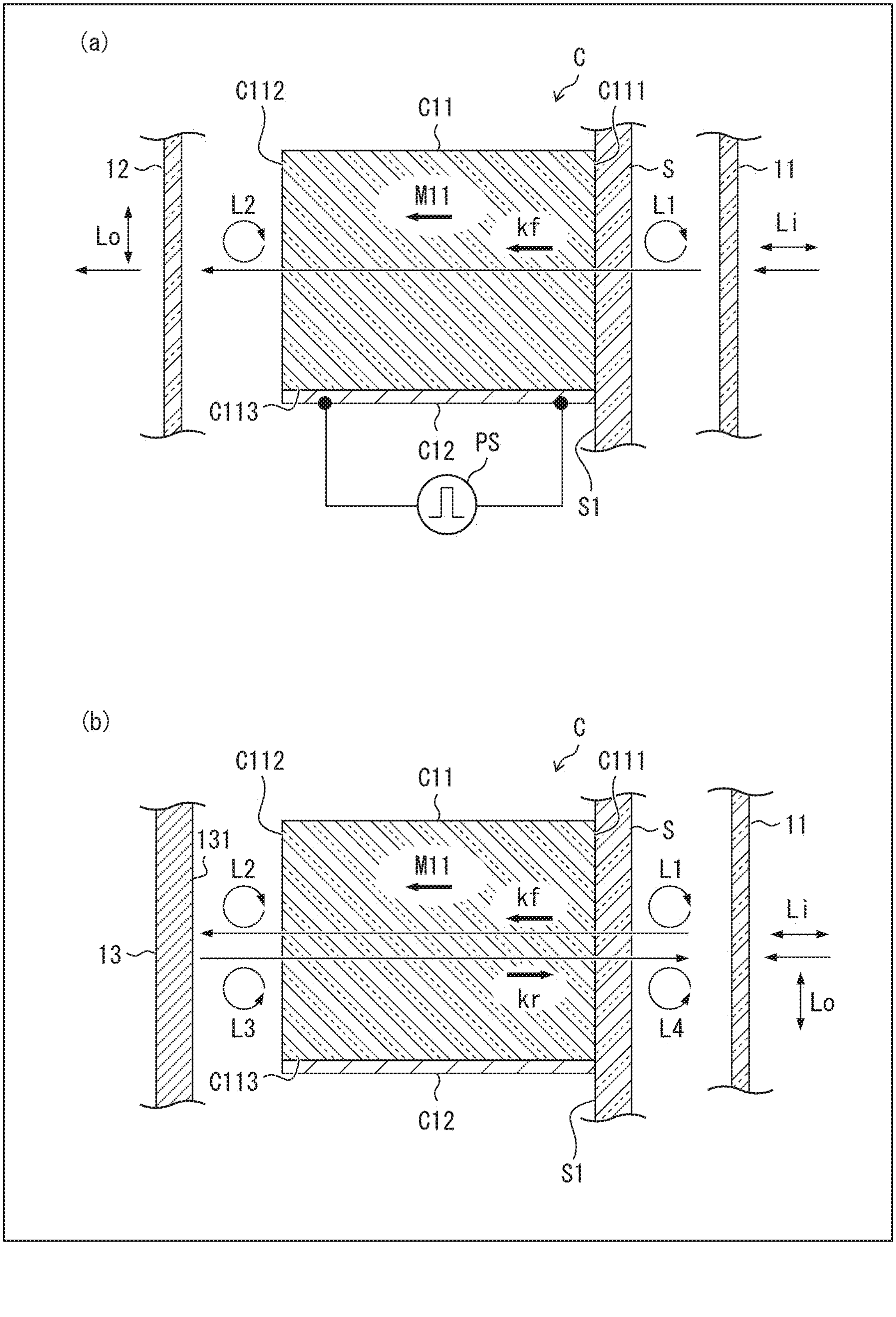
FIG. 3 are each a cross-sectional view illustrating a specific example of a microcell included in the spatial light modulator illustrated in (a) of FIG. 1.

With reference to FIG. 2, the following description will also discuss a unit cell $U_{CA}$ which is a variation of the unit cell $U_C$. FIG. 2 is a plan view illustrating a unit cell $U_{CA}$ With reference to FIG. 3, the following description will also discuss a specific example of each of microcells C that are included in the spatial light modulator SLM and that are included in the unit cell $U_C$. (a) and (b) of FIG. 3 are each a cross-sectional view illustrating a specific example of the microcell C. (a) of FIG. 3 illustrates a case where a transmission-type spatial light modulator is configured with use of the microcells C, and (b) of FIG. 3 illustrates a case where the spatial light modulator SLM is used as a reflection-type spatial light modulator.

<Spatial Light Modulator>

As illustrated in (a) of FIG. 1, the spatial light modulator SLM includes a substrate S, a plurality of microcells C which are two-dimensionally arranged (that is, arranged in a matrix) on one main surface S1 of the substrate S, and the black matrix BM. As illustrated in (b) of FIG. 1, the spatial light modulator SLM further includes the insulator I.

(Definition of Microcell)

In the present specification, the "microcell" means a cell having a cell size of less than 10 μm, for example. Further, the "cell size" means a square root of an area of a cell. For example, given that, as illustrated in (b) of FIG. 1, the microcell C is in the form of a square in plan view, the cell size of the microcell C is equal to a length $L_C$ of one side of the microcell C. A lower limit of the cell size of the microcell C is 1 nm, for example.

In the present example, the spatial light modulator SLM is constituted by 200×200 microcells C arranged in a matrix. A shape of each microcell C in plan view is a square of $L_C$=500 nm. Note that the cell size of the microcell C can be set as appropriate in accordance with a wavelength λ of signal light to be inputted into the spatial light modulator SLM. In an aspect of one or more embodiments, the cell size of the microcell C is preferably less than 1 μm. In an aspect of one or more embodiments, the cell size of the microcell C is preferably equal to or smaller than the wavelength λ. In the present example, as the wavelength λ, λ=500 nm is employed.

(Unit Cell)

As illustrated in (b) of FIG. 1, among the plurality of microcells C, 2×2 (four in total) microcells C adjacent to each other constitute a unit cell $U_C$. In the present example, the spatial light modulator SLM includes 100×100 unit cells $U_C$.

As illustrated in (c) of FIG. 1, each unit cell $U_C$ includes the four microcells C described above, two scanning lines SC1 and SC2, and two signal lines SG1 and SG2. Among the four microcells C, (i) the microcell C connected with the scanning line SC1 and the signal line SG1 is referred to as a microcell $C_{11}$, (ii) the microcell C connected with the scanning line SC1 and the signal line SG2 is referred to as a microcell $C_{12}$, (iii) the microcell C connected with a scanning line SC2 and signal line SG1 is referred to as a microcell $C_{21}$, and (iv) the microcell C connected with the scanning line SC2 and the signal line SG2 is referred to as a microcell $C_{22}$.

In the unit cell $U_C$, the microcells C adjacent to each other are spaced from each other (see (b) and (c) of FIG. 1). In the present example, a distance between the microcells C in the unit cell $U_C$ is 50 nm. Note, however, that the distance between the microcells C in the unit cell $U_C$ is not limited to this, and can be set as appropriate, provided that a tunnel electric current does not flow.

Therefore, in the unit cell $U_C$, a region in which the black matrix BM is not provided, that is, an effective region that signal light can enter has a shape of a square with sides each having a length $L_{UE}$ of $L_{UE}$=1050 nm (see (b) of FIG. 1). In other words, in the present example, the cell size of the effective region of the unit cell $U_C$ is 1050 nm and accordingly, is larger than the wavelength λ.

(Insulator)

In the unit cell $U_C$, the insulator (a light-transmitting insulator) I is provided in a gap provided between the microcells C. The insulator I is made of insulating material which has light transmissivity. Examples of the insulating material which has light transmissivity include resin. Filling the gap described above with liquid resin which has not been cured and then curing the liquid resin enable the insulator I to be interposed between the microcells C in the unit cells $U_C$.

In the spatial light modulator SLM, unit cells $U_C$ adjacent to each other are spaced from each other (see (b) and (c) of FIG. 1). In the present example, a distance between the unit cells $U_C$ is 150 nm. Note, however, that the distance between the unit cells $U_C$ in the spatial light modulator SLM is not limited to this, and can be set as appropriate, provided that the distance enables the scanning lines SC1 and SC2, the signal lines SG1 and SG2, and electrodes $E_{11}$, $E_{12}$, $E_{21}$, and $E_{22}$ described later to be accommodated.

(Black Matrix)

In the gap provided between the unit cells $U_C$, the black matrix BM is provided. In the black matrix, the scanning lines SC1 and SC2, the signal lines SG1 and SG2, and the electrodes $E_{11}$, $E_{12}$, $E_{21}$, and $E_{22}$ are embedded. The black matrix BM is made of insulating material having a light-blocking effect. As the material of which the black matrix BM is made, for example, material of which a black matrix used in a liquid crystal display (LCD) is made can be adapted. The gap provided between the unit cells $U_C$ is provided so as to surround the unit cells $U_C$. Thus, the black matrix is provided so as to surround the unit cells $U_C$.

Therefore, each unit cell $U_C$ has a shape of a square with sides each having a length $L_U$ of $L_U$=1200 nm (see (b) of FIG. 1). In other words, in the present example, a repetition interval of the unit cells $U_C$ is 1200 nm.

(Magnetization Free Layer and Electrode)

Each microcell C includes a magnetization free layer and an electrode. Although a specific configuration of the microcell C will be described later with reference to another drawing, a square portion of each microcell C (for example, the microcell $C_{11}$) corresponds to a magnetization free layer in (c) of FIG. 1, and a conductor layer provided on a side wall of the magnetization free layer corresponds to an electrode (an electrode $E_{11}$ in the case of the microcell $C_{11}$, for example) in (c) of FIG. 1.

(Scanning Lines and Signal Lines)

The scanning lines SC1 and SC2 in each unit cell $U_C$ are provided along a row direction (corresponding to a left-and-right direction in (c) of FIG. 1) of the spatial light modulator SLM. The scanning lines SC1 and SC2 are provided so as to sandwich the four microcells $C_{11}$, $C_{12}$, $C_{21}$, and $C_{22}$. In a state illustrated in (c) of FIG. 1, the scanning line SC1 is provided on an upper side of the microcells $C_{11}$, $C_{12}$, $C_{21}$, and $C_{22}$, and the scanning line SC2 is provided on a lower side of the microcells $C_{11}$, $C_{12}$, $C_{21}$, and $C_{22}$.

The signal lines SG1 and SG2 in the unit cell $U_C$ is provided along a column direction (an up-and-down direction in (c) of FIG. 1) of the spatial light modulator SLM. The signal lines SG1 and SG2 are provided so as to sandwich the four microcells $C_{11}$, $C_{12}$, $C_{21}$, and $C_{22}$. In a state illustrated in (c) of FIG. 1, the signal line SG1 is provided on a left side of the microcells $C_{11}$, $C_{12}$, $C_{21}$, and $C_{22}$, and the signal line SG2 is provided on a right side of the microcells $C_{11}$, $C_{12}$, $C_{21}$, and $C_{22}$.

(Switch)

The following description will take the microcell $C_{11}$ as an example among the microcells $C_{11}$, $C_{12}$, $C_{21}$, and $C_{22}$ constituting the unit cell $U_C$, to discuss a switch provided so as to be followed by the electrode $E_{11}$. The same applies to a switch provided to each of the microcells $C_{12}$, $C_{21}$, and $C_{22}$.

Although not illustrated in (c) of FIG. 1, a switch configured to control a spin current injected into the magnetization free layer of the microcell $C_{11}$ is provided so as to be followed by the electrode (the electrode $E_{11}$ in the case of the microcell $C_{11}$) when seen from the scanning line SC1 and the signal line SG1. As the switch, for example, a TFT or a CMOS can be used. In many cases, a TFT is used as the switch for a transmission-type spatial light modulator SLM, and a CMOS is used as the switch for a reflection-type spatial light modulator SLM.

(Anti-Reflection Film)

In an aspect of one or more embodiments, an anti-reflection film may be further included which is provided on a surface of each of the plurality of microcells C, although not illustrated in FIG. 1. The anti-reflection film is configured to reduce light reflection that may occur when light belonging to a specific wavelength band including a wavelength of the signal light enters the microcell C. The configuration of the anti-reflection film can be designed as appropriate in accordance with a range of the specific wavelength band.

In the present example, 500 nm is employed as the wavelength λ of the signal light, and thus it is only required that the specific wavelength band described above is a wavelength band including 500 nm. Here, the cell size of the microcell C is preferably equal to or smaller than the center wavelength of the specific wavelength band. In a case where the wavelength λ is 500 nm, examples of the specific wavelength band include a wavelength band of not less than 450 nm and not more than 550 nm.

(Variation of Unit Cell)

The unit cell $U_C$ illustrated in (b) and (c) of FIG. 1 includes the four microcells $C_{11}$, $C_{12}$, $C_{21}$, and $C_{22}$ arranged in two rows×two columns. Note, however, that in an aspect of one or more embodiments, the arrangement of the microcells C included in the unit cell $U_C$ is not limited to two rows×two columns and may be n rows×two columns. Here, n is an integer of not less than 3.

In the present variation, with reference to FIG. 2, the following description will discuss a unit cell $U_{CA}$ including eight microcells $C_{11}$, $C_{12}$, $C_{21}$, $C_{22}$, $C_{31}$, $C_{32}$, $C_{41}$, and $C_{42}$ arranged in four rows×two columns. Note that hereinafter, the microcells $C_{11}$, $C_{12}$, $C_{21}$, $C_{22}$, $C_{31}$, $C_{32}$, $C_{41}$, and $C_{42}$ are each also referred to simply as "microcell C" in a case where not required to be distinguished from each other.

The microcells $C_{31}$, $C_{32}$, $C_{41}$, and $C_{42}$ are configured as in the case of the microcells $C_{11}$, $C_{12}$, $C_{21}$, and $C_{22}$. Therefore, the shape of each microcell C in plan view is a square of $L_{CA}=L_{CB}=500$ nm. Note that in the present variation, the letter "A" is attached to the end of a sign representing a length along a row direction of the unit cell $U_{CA}$, and the letter "B" is attached to the end of a sign representing a length along a column direction of the unit cell $U_{CA}$. That is, the length $L_{CA}$ represents a length of a side along a row direction of the microcell C, which has a square shape, and the length $L_{CB}$ represents a length of a side along a column direction of the microcell C, which has a square shape. The same applies to the length $L_{UEA}$ and the length $L_{UEB}$ corresponding to the cell size of the effective region of the unit cell $U_{CA}$.

As described above, in the present variation, the eight microcells C are arranged in four rows×two columns, and thus the effective region of the unit cell $U_{CA}$ has a rectangular shape, not a square shape. Specifically, the length $L_{UEA}$ is $L_{UEA}=1050$ nm, which is equal to the length $L_{UE}$ illustrated in (b) of FIG. 1. On the other hand, the $L_{UEB}$ is $L_{UEB}=2150$ nm, which is longer than the length $L_{UE}$.

As such, increasing the number of the rows to be greater than two with the number of the columns kept two enables the cell size of the effective region in the column direction to be expanded. This makes it possible to further reduce a loss that may occur when the signal light enters the spatial light modulator SLM.

Note, however, that in the microcells C, an increased number of rows results in more elaborate wires connecting the electrodes and the scanning lines and more elaborate wires connecting the electrodes and the signal lines. As a result, it is required to increase the width of the gap which is provided between adjacent unit cells $U_{CA}$ and which accommodates the signal lines, leading to increase in width of the black matrix BM corresponding to the gap. This does not affect the cell sizes of the effective regions of the unit cells $U_{CA}$ but has an effect of reducing an area of the effective regions for the entire spatial light modulator SLM. Therefore, it is preferable to set the number n of the rows of the microcells C of each unit cell $U_{CA}$ so as to minimize a total loss taking into account an amount by which a loss is reduced due to increase in cell size in the column direction of the unit cell $U_{CA}$ and an amount by which a loss is increased due to increase in width of the black matrix BM.

Specific Example of Microcell

The following description will discuss the specific example of the microcell C which is included in the unit cell $U_C$ described above or in the unit cell $U_{CA}$ described above. Note that (a) and (b) of FIG. 3 respectively illustrate a case where a transmission-type spatial light modulator SLM is configured and a case where a reflection-type spatial light modulator SLM is configured, the configurations using a specific example of a microcell C which has the same configuration. Therefore, in the present specific example, the configuration of the specific example of the microcell C is first described, followed by description of a case where it is used as a transmission-type spatial light modulator SLM and description of a case where it is used as a reflection-type spatial light modulator SLM.

For example, as illustrated in (a) and (b) of FIG. 3, the present specific example of the microcell C includes a magnetization free layer C11 and an electrode C12.

The magnetization free layer C11 is a rectangular parallelepiped-shaped columnar member formed so as to stand on one main surface S1 of the substrate S. In the present example, a pair of bottom surfaces C111 and C112 facing each other among the six surfaces constituting the magnetization free layer C11 each have a shape of a square of 500 nm×500 nm, as described above. The squares illustrated in (b) and (c) of FIG. 1 each correspond to the bottom surface C112. Note that the bottom surfaces C111 and C112 of the magnetization free layer C11 refer to surfaces parallel to the main surface S1 of the substrate S, among the six surfaces constituting the magnetization free layer C11.

Each of the bottom surface C111 and the bottom surface C112 is a surface that transmits light in the magnetization free layer C11 and is one example of an optically effective surface. In the present specific example, right circularly polarized light L1 which is the signal light enters the bottom surface C111, and right circularly polarized light L2 which is signal light whose phase has been modulated by the magnetization free layer C11 exits from the bottom surface C112. The bottom surface C111 configured as above is one example of a first optically effective surface, and the bottom surface C112 configured as above is one example of a second optically effective surface.

(a) of FIG. 3 indicates, as an arrow kf, a propagation direction of the right circularly polarized light L1 which is the signal light. The arrow kf indicates a direction from the bottom surface C111 toward the bottom surface C112, that is, in a state illustrated in (a) of FIG. 3, a direction from a right side of the magnetization free layer C11 toward a left side of the magnetization free layer C11.

The magnetization free layer C11 is made of a soft magnetic material having electric conductivity and light transmissivity (for example, CoFeB). Note, however, that the soft magnetic material of which the magnetization free layer C11 is made is not limited to the CoFeB. Examples of another soft magnetic material of which the magnetization free layer C11 is made include, as in the case of a spin orbit torque (SOT)-MRAM, an yttrium iron garnet (YIG), which is a magnetic garnet, and a substituted magnetic garnet in which part of yttrium of the YIG is substituted for Bi or Ce, for example.

The electrode C12 is an electrically conductive film formed on one of the four side surfaces among the six surfaces constituting the magnetization free layer C11, excluding the pair of bottom surfaces described above. In a state illustrated in (a) of FIG. 3, the electrode C12 is formed on a side surface located on a lower side of the magnetization free layer C11. In the present specific example, the electrode C12 is a single electrode.

An electrical conductor of which the electrode C12 is made preferably contains heavy metal. Examples of the heavy metal include palladium (Pd), platinum (Pt), tantalum (Ta), and tungsten (W). The electrode C12 may be made of one heavy metal of these heavy metals or may be made of an alloy of a plurality of heavy metals of these heavy metals. Alternatively, the electrode C12 may be made of an alloy of at least one of these heavy metals and a transition metal. The electrode C12 may be constituted by a multilayer film including a layer made of at least one of the above heavy metals and a layer made of at least one of the above transition metals.

In addition, an optical computing device 1 includes a power source PS connected with the electrode C12 of each of the microcells C (see (a) of FIG. 3). The power source PS is configured to generate a pulse voltage or a pulse current. In the present example, the power source PS is configured to supply a pulse voltage. Here, the pulse voltage refers to a voltage having a waveform in which the voltage exceeds a predetermined voltage only for an extremely short period of time in a case where time is represented in a horizontal axis and voltage is represented in a vertical axis. The pulse current refers to a current having a waveform in which the current exceeds a predetermined current only for an extremely short period of time in a case where time is represented in a horizontal axis and current is represented in a vertical axis. The pulse voltage or the pulse current generated by the power source PS connected with the electrode C12 may be a continuous pulse or a single pulse.

When the pulse voltage or the pulse current is applied to the electrode C12, a spin current, which is a flow of spin-polarized electrons, is injected from the electrode C12 into the magnetization free layer C11, as in the case of a SOT-MRAM. As such, the electrode C12 is an electrode that injects a spin current into the magnetization free layer C11. In the present specific example, a polarization direction of the spin current injected into the magnetization free layer C11 is a direction parallel or substantially parallel to normal directions of the bottom surfaces C111 and C112 and, a direction of the spin current is a direction from the bottom surface C111 toward the bottom surface C112.

The magnetization free layer C11 is magnetized so as to be aligned with the polarization direction of the spin current injected. (b) of FIG. 2 indicates, as an arrow M11, a direction of magnetization of the magnetization free layer C11.

As such, in the present specific example, the magnetization free layer C11 is configured such that a direction of magnetization that occurs when the spin current is injected from the electrode C12 into the magnetization free layer C11 is parallel or substantially parallel to the normal directions of the bottom surface C111 and the bottom surface C112. Specifically, the propagation direction (see the arrow kf) of the right circularly polarized light L1 which is signal light to be inputted and the direction of the magnetization (see the arrow M11) of the magnetization free layer C11 are parallel or substantially parallel to each other and are the same direction.

The magnetization free layer C1 configured as above enables the phase of the right circularly polarized light L1 to delay or advance, in accordance with a magnitude of the magnetization. That is, the magnetization free layer C11 can control a phase-modulation amount of the right circularly polarized light L1 in accordance with the magnitude of the magnetization.

The magnitude of the magnetization of the magnetization free layer C11 is determined in accordance with a magnitude of the spin current injected into the magnetization free layer C11. In addition, a magnitude of the spin current injected into the magnetization free layer C11 is determined in accordance with a magnitude of the pulse voltage or the pulse current supplied from the power source PS to the electrode C12. Therefore, controlling the magnitude of the pulse voltage or the pulse current supplied from the power source PS to the electrode C12 enables the phase-modulation amount of the microcell C to be controlled. As such, each of the microcells C of the present specific example functions as a spin injection-type optical phase modulator.

In the signal light propagating inside the magnetization free layer, right circularly polarized light and left circularly polarized light have different refractive indices, and thus a phase difference occurs between the right circularly polarized light and the left circularly polarized light due to the magnetization of the magnetization free layer. The phase difference occurring between the right circularly polarized light and the left circularly polarized light is known as the Faraday effect.

In the microcells C of the present specific example, a liquid crystal is not used unlike an LCOS, and a mirror that moves mechanically is not used unlike a DMD. An LCOS and a DMD need to have a certain degree of size for smooth operation because the operating principles thereof are based on bulk properties. When the structures are smaller, the influence of, for example, intermolecular force from the wall surface is stronger, especially at the nano-size level. This causes the original operability to be lost.

In each of the microcells C of the present specific example, an optical phase modulator configured as in the case of the SOT-MRAM is employed as a configuration for injecting a spin current into the magnetization free layer. The magnetization of the magnetization free layer caused by spin injection is a phenomenon that occurs in a nanoscale space.

Therefore, a device that, like the present specific example, uses magnetization due to spin injection tends to be closer to an original high-speed operation when a size of each microcell is smaller. Thus, like an MRAM, the present specific example is capable of being reduced in size and operating at high speed.

Therefore, the present specific example makes it possible to provide an optical phase modulator capable of being reduced in size and operating at high speed. In addition, the black matrix BM is provided to the spatial light modulator SLM so as to surround the unit cells $U_C$, as illustrated in (b) of FIG. 1. Further, each unit cell $U_C$ includes a predetermined number of microcells C adjacent to each other. Therefore, the spatial light modulator SLM makes it possible to provide a spatial light modulator capable of reducing a cell size and reducing a loss occurring due to the reduced size.

(Case where Transmission-Type Optical Phase Modulator is Configured)

In a case where circularly polarized light (the right circularly polarized light L1 in (a) of FIG. 3) is inputted into the specific example of the microcell C configured as above, the specific example of the microcell C can modulate a phase of the circularly polarized light. Therefore, the specific example of the microcell C can, even if it is a single entity, constitute a transmission-type optical phase modulator.

However, in a case where an optical system is assembled, linearly polarized light is easier to treat than circularly polarized light in many cases. Therefore, a quarter wave plate 11 and a quarter wave plate 12 being provided so as to be followed by and follow the microcell C, respectively, enable signal light Lo which is linearly polarized light to be, in a case where signal light Li which is linearly polarized light is inputted into the quarter wave plate 11, outputted from the quarter wave plate 12.

(Case where Transmission-Type Light Intensity Modulator is Configured)

The specific example of the microcell C can also constitute an optical phase modulator. In this case, it is only required that the configuration illustrated in (a) of FIG. 3 is used as a base, the quarter wave plate 11 is omitted, and a polarizing plate is used instead of the quarter wave plate 12.

(Case where Reflection-Type Optical Phase Modulator is Configured)

Further, in a case where a reflection-type optical phase modulator is configured with use of the specific example of the microcell C, it is only required that a mirror 13 is provided so as to face the bottom surface C112 of the magnetization free layer C11, as illustrated in (b) of FIG. 3. According to this configuration, the right circularly polarized light L2 which has exited from the bottom surface C112 is reflected as left circularly polarized light L3 by a reflection surface 131 of the mirror 13.

The left circularly polarized light L3 which has been reflected by the reflection surface 131 enters the bottom surface C112 again and propagates in a direction toward the bottom surface C111 (in a direction of an arrow kr illustrated in (b) of FIG. 3). Here, a direction of the magnetization of the magnetization free layer C11 remains the direction of the arrow M11, and thus the magnetization free layer C11 modulates a phase of the left circularly polarized light L3 as in the case of the modulation of a phase of the right circularly polarized light L1.

Therefore, in a case where a reflection-type optical phase modulator is configured with use of the specific example of the microcell C, it is possible to yield a phase-modulation amount twice as large as that of a case where the transmission-type optical phase modulator illustrated in (a) of FIG. 3 is configured and the magnitudes of the magnetization of the magnetization free layers C11 are the same.

In the optical system illustrated in (b) of FIG. 3, a light path of the signal light Li inputted into the magnetization free layer C1 and a light path of the signal light Lo outputted from the magnetization free layer C11 agree with each other. Note, however, that the signal light Li and the signal light Lo, although they are each linearly polarized light, have different polarization directions and thus can be separated from each other in a case where a polarization beam splitter is provided further so as to be followed by the quarter wave plate 11.

Example 2

Figure 4:
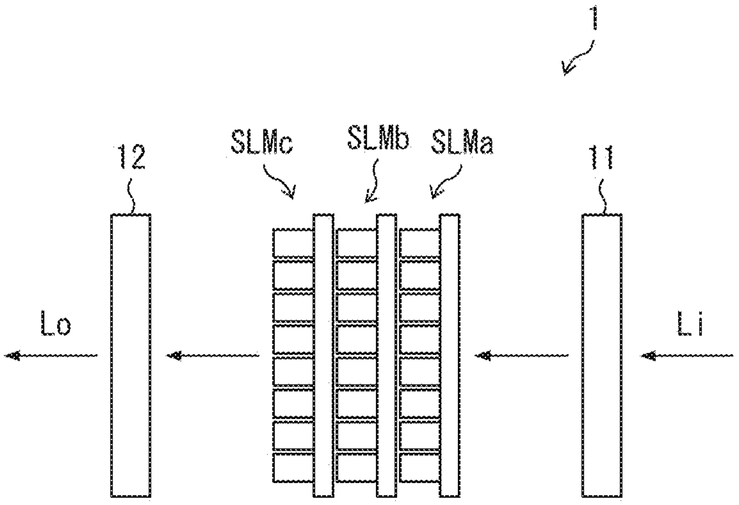
FIG. 4 is a view schematically illustrating an optical computing device in accordance with Example 2 of one or more embodiments.

With reference to FIG. 4, the following description will discuss an optical computing device 1 in accordance with Example 2 of one or more embodiments. FIG. 4 is a view schematically illustrating the optical computing device 1.

The optical computing device 1 is based on the arrangement illustrated in (a) of FIG. 3. Note, however, that in the arrangement illustrated in (a) of FIG. 3, the single spatial light modulator SLM is provided on a light path between the quarter wave plate 11 and the quarter wave plate 12. In contrast, in the optical computing device 1 illustrated in FIG. 4, spatial light modulators SLMa, SLMb, and SLMc are provided on the light path between the quarter wave plate 11 and the quarter wave plate 12. According to this configuration, in a case where the signal light Li is inputted into the optical computing device 1, the optical computing device 1 can cause the spatial light modulators SLMa, SLMb, and SLMc to act on the signal light Li in this order and output the signal light Lo.

Note that in the present example, a transmission-type optical computing device is described on the basis of the arrangement illustrated in (a) of FIG. 3. However, in an aspect of one or more embodiments, it is also possible to configure a reflection-type optical computing device by using the arrangement illustrated in (b) of FIG. 3 as a base and replacing the single spatial light modulator SLM with the spatial light modulators SLMa, SLMb, and SLMc.

(Recap 1)

A spatial light modulator in accordance with Aspect 1 of one or more embodiments is a spatial light modulator including: a plurality of microcells which are two-dimensionally arranged and each of which has a cell size of less than 1 μm; and a black matrix. In the present spatial light modulator, a configuration is employed in which the plurality of microcells include a plurality of unit cells each of which includes a predetermined number of microcells adjacent to each other, and the black matrix is provided so as to surround each of the plurality of unit cells.

According to the above configuration, even in a case where the cell size of each of the microcells is less than 1 μm, the cell size of the unit cell surrounded by the black matrix is not less than 1 μm. Therefore, in the present spatial light modulator, even in a case where the cell size is reduced to be less than 1 μm, the signal light that enters each of the microcells is unlikely affected by the black matrix. This enables a loss that may occur in the signal light to be reduced.

In addition, in a spatial light modulator in accordance with Aspect 2 of one or more embodiments, in addition to the configuration of the spatial light modulator in accordance with Aspect 1 above, a configuration is employed in which: each of the plurality of microcells is constituted by a spin injection-type optical phase modulator including a magnetization free layer and an electrode configured to inject a spin current into the magnetization free layer; the magnetization free layer has a first optically effective surface and a second optically effective surface that face each other; and the magnetization free layer is configured such that a direction of magnetization that occurs when the spin current is injected from the electrode into the magnetization free layer is parallel or substantially parallel to normal directions of the first optically effective surface and the second optically effective surface.

In each of the microcells of the present spatial light modulator, an optical phase modulator configured as in the case of the spin transfer torque magnetic reversal (STT)-magnetoresistive random access memory (MRAM) or the spin orbit torque (SOT)-MRAM is employed as a configuration for injecting the spin current into the magnetization free layer. The magnetization of the magnetization free layer caused by spin injection is a phenomenon that occurs in a nanoscale space. Therefore, a device that uses magnetization caused by spin injection tends to be closer to an original high-speed operation when a size of each microcell is smaller. Thus, like an MRAM, the present spatial light modulator is capable of being reduced in size and operating at high speed.

The magnetization free layer is magnetized so as to be parallel or substantially parallel to the normal directions of the first optically effective surface and the second optically effective surface due to the spin current, which is a flow of spin-polarized electrons. In each of the microcells, the signal light propagates inside the magnetization free layer along the normal directions of the first optically effective surface and the second optically effective surface. Therefore, in each of the microcells, the propagation direction of the signal light is parallel or substantially parallel to the magnetization direction in the magnetization free layer. Therefore, in each of the microcells, it is possible to control a phase-modulation amount of the microcell with use of a magnitude of the spin current injected into the magnetization free layer of the microcell.

Therefore, the present spatial light modulator configured as above makes it possible to provide an optical phase modulator capable of being reduced in size and operating at high speed.

In addition, in a spatial light modulator in accordance with Aspect 3 of one or more embodiments, in addition to the configuration of the spatial light modulator in accordance with Aspect 1 or 2 above, a configuration is employed in which in each of the plurality of microcells, the electrode thereof is a single electrode made of material containing heavy metal.

According to the above configuration, in each of the microcells of the present spatial light modulator, a configuration similar to the SOT-MRAM is employed as a configuration for injecting a spin current into the magnetization free layer. Therefore, the present spatial light modulator makes it possible to operate at higher speed than a spatial light modulator that employs a configuration similar to the STT-MRAM as a configuration for injecting a spin current into the magnetization free layer. According to the above configuration, it is possible to increase the conversion efficiency at which a current is converted into a spin current polarized according to one spin.

In addition, in a spatial light modulator in accordance with Aspect 4 of one or more embodiments, in addition to the configuration of the spatial light modulator in accordance with Aspect 3 above, a configuration is employed of further including a power source which is connected with the electrode and which is configured to generate a pulse voltage or a pulse current.

According to the above configuration, it is possible to further increase the conversion efficiency.

In addition, in a spatial light modulator in accordance with Aspect 5 of one or more embodiments, in addition to the configuration of the spatial light modulator in accordance with any one of Aspects 1 to 4 above, a configuration is employed in which the spatial light modulator further includes an anti-reflection film which is provided on each of surfaces of the plurality of microcells and which is configured to reduce reflection of light belonging to a specific wavelength band, and the cell size is equal to or smaller than a center wavelength of the specific wavelength band.

According to the above configuration, it is possible to, in a case where light having a wavelength close to the center wavelength is used as the signal light, further reduce a loss that may occur when the signal light enters each microcell.

In addition, in a spatial light modulator in accordance with Aspect 6 of one or more embodiments, in addition to the configuration of the spatial light modulator in accordance with any one of Aspects 1 to 5 above, a configuration is employed in which: among the predetermined number of microcells included in each of the unit cells, the microcells adjacent to each other are spaced from each other; and the spatial light modulator further includes an insulator which is interposed between the microcells adjacent to each other and which has light transmissivity.

According to the above configuration, it is possible to prevent a situation in which in a case where a spin current is injected into the magnetization free layer of a microcell, the spin current is unintentionally injected into a microcell adjacent to the microcell. Therefore, it is possible to increase accuracy of a case where a phase-modulation amount of each microcell is controlled.

A spatial light modulator in accordance with Aspect 7 of one or more embodiments is a spatial light modulator including: a plurality of microcells which are two-dimensionally arranged and each of which has a cell size equal to or smaller than a wavelength of signal light; and a black matrix. In the present spatial light modulator, a configuration is employed in which the plurality of microcells include a plurality of unit cells each of which includes a predetermined number of microcells adjacent to each other, and the black matrix is provided so as to surround each of the plurality of unit cells.

In an aspect of one or more embodiments, in a case where light having a wavelength of not less than 1 μm is used as signal light (for example, in a case where the signal light has a wavelength of 2 μm or 3 μm), the cell size of each microcell is not limited to less than 1 μm, unlike the spatial light modulator in accordance with Aspect 1 and is only required to be equal to or smaller than the wavelength of the signal light. According to the above configuration, even in a case where light in a near-infrared region is used as the signal light, the signal light that enters each microcell is unlikely affected by the black matrix. This enables a loss that may occur in the signal light to be reduced.

In addition, in a spatial light modulator in accordance with Aspect 8 of one or more embodiments, in addition to the configuration of the spatial light modulator in accordance with Aspect 7 above, a configuration is employed in which the spatial light modulator further includes an anti-reflection film which is provided on each of surfaces of the plurality of microcells and which is configured to reduce reflection of light belonging to a specific wavelength band, and the cell size is equal to or smaller than a center wavelength of the specific wavelength band.

According to the above configuration, it is possible to, in a case where light having a wavelength close to the center wavelength is used as the signal light, further reduce a loss that may occur when the signal light enters each microcell.

In addition, in optical computing device in accordance with Aspect 9 of one or more embodiments includes a plurality of the spatial light modulators each in accordance with any one of Aspects 1 to 8 above. In the present optical computing device, the plurality of the spatial light modulators are arranged so as to sequentially act on signal light.

The above configuration enables each spatial light modulator to be reduced in size and operate at higher speed, and thus makes it possible to provide an optical computing device capable of being reduced in size and operating at high speed.

(Recap 2)

A spatial light modulator in accordance with Aspect 1 of one or more embodiments is a spatial light modulator including: a plurality of microcells each of which has a cell size of less than 1 μm or has a cell size equal to or smaller than a wavelength of signal light; and a black matrix. In the present spatial light modulator, a configuration is employed in which the plurality of microcells include a plurality of unit cells each of which includes a predetermined number of microcells adjacent to each other, and the black matrix is provided so as to surround the plurality of unit cells.

According to the above configuration, even in a case where the cell size of each of the microcell is less than 1 μm, the cell size of the unit cell surrounded by the black matrix is not less than 1 μm. Therefore, in the present spatial light modulator, even in a case where the cell size is reduced to be less than 1 μm, the signal light that enters each of the microcells is unlikely affected by the black matrix. This enables a loss that may occur in the signal light to be reduced.

In a case where light having a wavelength of not less than 1 μm is used as signal light (for example, in a case where the signal light has a wavelength of 2 μm or 3 μm), the cell size of each microcell is not limited to less than 1 μm, unlike the spatial light modulator in accordance with Aspect 1 and is only required to be equal to or less than the wavelength of the signal light. According to the above configuration, even in a case where light in a near-infrared region is used as the signal light, the signal light that enters each microcell is unlikely affected by the black matrix. This enables a loss that may occur in the signal light to be reduced.

In addition, in a spatial light modulator in accordance with Aspect 2 of one or more embodiments, in addition to the configuration of the spatial light modulator in accordance with Aspect 1 above, a configuration is employed in which: each of the plurality of microcells is constituted by a spin injection-type optical phase modulator including a magnetization free layer and an electrode configured to inject a spin current into the magnetization free layer; the magnetization free layer has a first optically effective surface and a second optically effective surface that face each other; and the magnetization free layer is configured such that a direction of magnetization that occurs when the spin current is injected from the electrode into the magnetization free layer is parallel or substantially parallel to normal directions of the first optically effective surface and the second optically effective surface.

In each of the microcells of the present spatial light modulator, an optical phase modulator which is configured as in the case of the spin transfer torque magnetic reversal (STT)-magnetoresistive random access memory (MRAM) or the spin orbit torque (SOT)-MRAM is employed as a configuration for injecting the spin current into the magnetization free layer. The magnetization of the magnetization free layer caused by spin injection is a phenomenon that occurs in a nanoscale space. Therefore, a device that uses magnetization caused by spin injection tends to be closer to an original high-speed operation when a size of each microcell is smaller. Thus, like an MRAM, the present spatial light modulator is capable of being reduced in size and operating at high speed.

The magnetization free layer is magnetized so as to be parallel or substantially parallel to the normal directions of the first optically effective surface and the second optically effective surface due to the spin current, which is a flow of spin-polarized electrons. In each of the microcells, the signal light propagates inside the magnetization free layer along the normal directions of the first optically effective surface and the second optically effective surface. Therefore, in each of the microcells, the propagation direction of the signal light is parallel or substantially parallel to the magnetization direction in the magnetization free layer. Therefore, in each of the microcells, it is possible to control a phase-modulation amount of the microcell with use of a magnitude of the spin current injected into the magnetization free layer of the microcell.

Therefore, the present spatial light modulator configured as above makes it possible to provide an optical phase modulator capable of being reduced in size and operating at high speed.

In addition, in a spatial light modulator in accordance with Aspect 3 of one or more embodiments, in addition to the configuration of the spatial light modulator in accordance with Aspect 1 or 2 above, a configuration is employed in which in each of the plurality of microcells, the electrode thereof is a single electrode made of material containing heavy metal.

According to the above configuration, in each of the microcells of the present spatial light modulator, a configuration similar to the SOT-MRAM is employed as a configuration for injecting a spin current into the magnetization free layer. Therefore, the present spatial light modulator makes it possible to operate at higher speed than a spatial light modulator that employs a configuration similar to the STT-MRAM as a configuration for injecting a spin current into the magnetization free layer. According to the above configuration, it is possible to increase the conversion efficiency at which a current is converted into a spin current polarized according to one spin.

In addition, in a spatial light modulator in accordance with Aspect 4 of one or more embodiments, in addition to the configuration of the spatial light modulator in accordance with Aspect 3 above, a configuration is employed in which the spatial light modulator further includes a power source which is connected with the electrode and which is configured to generate a pulse voltage or a pulse current.

According to the above configuration, it is possible to further increase the conversion efficiency.

In addition, in a spatial light modulator in accordance with Aspect 5 of one or more embodiments, in addition to the configuration of the spatial light modulator in accordance with any one of Aspects 1 to 4 above, a configuration is employed in which the spatial light modulator further includes an anti-reflection film which is provided on each of surfaces of the plurality of microcells and which is configured to reduce reflection of light belonging to a specific wavelength band, and the cell size is equal to or smaller than a center wavelength of the specific wavelength band.

According to the above configuration, it is possible to, in a case where light having a wavelength close to the center wavelength is used as the signal light, further reduce a loss that may occur when the signal light enters each microcell.

In addition, in a spatial light modulator in accordance with Aspect 6 of one or more embodiments, in addition to the configuration of the spatial light modulator in accordance with any one of Aspects 1 to 5 above, a configuration is employed in which: among the predetermined number of microcells included in each of the unit cells, the microcells adjacent to each other are spaced from each other; and the spatial light modulator further includes an insulator which is interposed between the microcells adjacent to each other and which has light transmissivity.

According to the above configuration, it is possible to prevent a situation in which in a case where a spin current is injected into the magnetization free layer of a microcell, the spin current is unintentionally injected into a microcell adjacent to the microcell. Therefore, it is possible to increase accuracy of a case where a phase-modulation amount of each microcell is controlled.

In addition, an optical computing device in accordance with Aspect 7 of one or more embodiments includes a plurality of the spatial light modulators each in accordance with any one of Aspects 1 to 6 above. In the present optical computing device, the plurality of the spatial light modulators are arranged so as to sequentially act on signal light.

The above configuration enables each spatial light modulator to be reduced in size and operate at higher speed, and thus makes it possible to provide an optical computing device capable of being reduced in size and operating at high speed.

Additional Remarks

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

SLM, SLMa, SLMb, SLMc Spatial light modulator
S Substrate
S1 Main surface
C Microcell
$C_{11}$, $C_{12}$, $C_{21}$, $C_{22}$, $C_{31}$, $C_{32}$, $C_{41}$, $C_{42}$ Microcell
$U_C$ Unit cell
BM Black matrix
I Insulator
1 Optical computing device

The invention claimed is:

1. A spatial light modulator comprising:

unit cells each comprising two or more adjacent microcells, wherein the microcells each have a cell size that is either:

less than 1 μm, or equal to or smaller than a wavelength of signal light; and a black matrix that surrounds the unit cells, wherein in each of the unit cells, the microcells correspond to respective pixels of the spatial light modulator and are each independently driven to modulate the signal light, and in each of the unit cells, the black matrix is not disposed in a gap between an adjacent pair of the microcells.

2. The spatial light modulator according to claim 1, wherein each of the microcells is constituted by a spin injection-type optical phase modulator including a magnetization free layer and an electrode that injects a spin current into the magnetization free layer, the magnetization free layer has a first optically effective surface and a second optically effective surface opposite to the first optically effective surface, and a direction of magnetization in the magnetization free layer, occurring when the spin current is injected from the electrode into the magnetization free layer, is parallel or substantially parallel to normal directions of the first optically effective surface and the second optically effective surface.

3. The spatial light modulator according to claim 2, wherein the electrode in each of the microcells contains heavy metal.

4. The spatial light modulator according to claim 3, further comprising:

a power source, connected to the electrode in each of the microcells, that generates a pulse voltage or a pulse current.

5. The spatial light modulator according to claim 1, wherein each surface of the microcells has an anti-reflection film that reduces reflection of light belonging to a wavelength band, and the cell size of each of the microcells is equal to or smaller than a center wavelength of the wavelength band.

6. The spatial light modulator according to claim 1, wherein in each of the unit cells, the two or more adjacent microcells are spaced from each other with a light-transmitting insulator interposed therebetween.

7. An optical computing device comprising:

spatial light modulators, each of which is the spatial light modulator according to claim 1, arranged to sequentially act on the signal light.

8. The spatial light modulator according to claim 1, further comprising:

scanning lines and signal lines configured to drive the microcells;

electrodes each disposed for a respective one of the microcells; and switches each disposed for a respective one of the microcells and configured to control driving of the respective one of the microcells, wherein each of the microcells is connected to a respective combination of one of the scanning lines and one of the signal lines, the scanning lines and the signal lines are disposed to surround each of the unit cells, and the scanning lines, the signal lines, and the black matrix are disposed in gaps between adjacent unit cells of the unit cells but are not disposed in the gap between the adjacent pair of the microcells.

* * * * *